US005736055A

United States Patent [19]

Cooper

[11] Patent Number: 5,736,055
[45] Date of Patent: Apr. 7, 1998

[54] CARTRIDGE FOR PHOTOCATALYTIC PURIFICATION OF FLUIDS

[75] Inventor: Gerald Cooper, Boulder, Colo.

[73] Assignee: Photo-Catalytics, Inc., Boulder, Colo.

[21] Appl. No.: 442,195

[22] Filed: May 16, 1995

[51] Int. Cl.[6] ........................................ C02F 1/32
[52] U.S. Cl. .............. 210/748; 210/169; 204/157.15; 204/158.2; 250/432 R; 250/435; 250/436; 422/24; 422/186.3
[58] Field of Search .................... 210/748, 169; 250/432 R, 435, 436; 422/186.3, 24; 204/157.15, 158.2; 502/5, 527, 522

[56] References Cited

U.S. PATENT DOCUMENTS 4,888,101 12/1989 Cooper ........................ 204/157
4,892,712 1/1990 Robertson et al. ............. 422/186
5,227,053 7/1993 Brym ............................ 210/143
5,449,443 9/1995 Jacoby et al. ................. 204/158.2

FOREIGN PATENT DOCUMENTS 1331084 9/1973 United Kingdom .

Primary Examiner—Neil McCarthy
Attorney, Agent, or Firm—Sheridan Ross P.C.

[57] ABSTRACT

The present invention relates to a replacable cartridge for use in a photocatalytic fluid purification system. The cartridge is capable of modifying impurities in a fluid flowing through the cartridge in the presence of light. The cartridge includes a flexible, porous element having a semiconductor coating associated with it and a rigid support structure which supports the element. The cartridge may be used in a variety of fluid purification applications where photocatalysis has not heretofore been utilized.

26 Claims, 12 Drawing Sheets

SOLAR ILLUMINATION

CARTRIDGE FOR PHOTOCATALYTIC PURIFICATION OF FLUIDS

FIELD OF THE INVENTION

The invention relates generally to photocatalytic fluid purification systems, and, more particularly, to a novel cartridge for use in a photocatalytic fluid purification system.

BACKGROUND OF THE INVENTION

Photocatalysis is a process in which a chemical composition may be modified by bringing the composition into the vicinity of a semiconductor material in the presence of light having an energy level greater than or equal to the bandgap of the material. This process may be used, for example, to break down a harmful chemical substance into a number of inert components. Because of its ability to transform harmful substances, photocatalysis is known for being useful in fluid purification systems. An example of such a system can be found in U.S. Pat. No. 4,888,101 issued to the present inventor and hereby incorporated by reference.

Fluid purification systems are used in a vast number of different applications. Photocatalysis, however, has only been used in a limited number of these applications. One reason for the limited use of this technology is that photocatalytic purification systems are generally more expensive to implement than other types of systems. Another reason is that known photocatalytic systems have not been successfully developed or adapted for many potential applications. For example, known photocatalytic systems lose their effectiveness over time due to a buildup of surface contaminants on the photocatalyst and this has limited their usefulness in many applications.

A need therefore exists for a method and apparatus for implementing photocatalytic fluid purification in a practical manner in a wider variety of applications than have been known before.

SUMMARY OF THE INVENTION

The present invention relates to a replaceable cartridge for use in a photocatalytic fluid purification system. The cartridge is of simple construction and is relatively inexpensive to manufacture. The cartridge can be removably inserted into a system, used for a period of time, and then replaced after its effectiveness has been reduced below an acceptable level. The disposable nature of the cartridge makes it a practical alternative for fluid purification applications where photocatalysis has not heretofore been utilized. The invention is useful in a variety of different fluid purification applications including, for example, purifying the water in an aquarium.

In one aspect of the present invention, a replaceable cartridge for use in a fluid purification system is provided. The cartridge includes a flexible, porous element having a semiconductor coating bound to it and a rigid support structure for supporting the element. The flexible, porous element can include a fibrous mesh, made of a material such as fiberglass or glass wool, which may be woven or unwoven. The element is impregnated with a semiconductor coating which may include one or more of the following: $TiO_2$, $ZnO$, $SnO_2$, $SrTiO_3$, $WO_3$, or $Fe_2O_3$. The semiconductor coating may be associated with the flexible, porous element by a process which includes contacting the element with a slurry made of a liquid and a semiconductor powder and then evaporating the liquid from the element. It may also be deposited on the flexible, porous element by other means such as chemical reaction, vapor deposition or chemical-vapor deposition. To operate effectively and efficiently, the photocatalyst coated, flexible, porous element should be capable of absorbing a substantial portion of the light produced by a light source placed near the element, wherein the light reaches a depth in the element sufficient to provide adequate photocatalytic cross-section. Adequate photocatalytic cross-section means that the photocatalyst is distributed on the element in a manner such that substantially all of the fluid moving through the element comes into intimate contact with the photocatalyst and that simultaneously a large part of the photocatalyst is able to be illuminated with light.

The rigid support structure is located next to the flexible, porous element for providing support to the element, which may be structurally weak. The rigid support structure may be made of a material such as polypropylene, polyethylene, flouroelastomers, or other similar polymeric material. The rigid support structure may also be made of glass or other rigid material. The cartridge may further include a component for attaching the rigid support structure to the flexible, porous element for providing further support to the element. In addition, the cartridge may include a fluid seal structure for facilitating the flow of fluid through the element.

In another aspect of the present invention, a photocatalytic fluid purification system is provided. The system includes a photocatalytic unit into which a cartridge, such as the cartridge described above, having a flexible, porous element with a semiconductor coating associated with it and a rigid support structure for supporting the element, may be removably inserted. The photocatalytic unit includes a fluid inlet, for carrying impure fluid to the cartridge, and a fluid outlet, for carrying purified fluid away from the cartridge. The photocatalytic unit also includes a structure for conducting fluid from the fluid inlet, through the element, and to the fluid outlet.

In addition, the photocatalytic unit includes a light source for illuminating the flexible, porous element during operation of the system. The light source must be capable of emitting light having an energy level greater than or equal to the bandgap energy of the semiconductor material associated with the element. The light source may be located in close proximity to the cartridge, but it does not have to be physically coupled to the cartridge. In one embodiment, a tubular light source is mounted within a tubular pocket in a cylindrically wound element. In another embodiment, a planar photocatalytic element lends itself to use with solar radiation or reflected illumination from an external source.

The system of the present invention may also include: a fluid reservoir containing a fluid to be purified, a structure for conducting fluid from the reservoir to the fluid inlet of the photocatalytic unit, a structure for conducting fluid from the fluid outlet of the photocatalytic unit to the reservoir, and an apparatus for creating pressurized fluid flow through the cartridge. The fluid reservoir may include, for example, an aquarium, a cistern of drinking water, a holding tank filled with high purity water, air in a room, or a gas containing vessel. The structures for conducting fluid may include, for example, pipes, tubes, or hoses connected between the reservoir and the unit. The apparatus for creating pressurized fluid flow through the cartridge may include, for example, a pump, fan, or similar device, connected somewhere in the fluid flow path. As an alternative to the above configuration, the system may include two reservoirs, a first one containing impure fluid and a second one containing purified fluid, in which case a structure is provided for conducting impure fluid from the first reservoir to the fluid inlet of the photocatalytic unit and a structure is provided for conducting purified fluid from the fluid outlet of the photocatalytic unit to the second reservoir.

In a third aspect of the present invention, a process is provided for purifying the water in an aquarium using photocatalysis. The process comprises the steps of delivering water from an aquarium to a photocatalytic unit, contacting the water with a photocatalytic element within the photocatalytic unit in the presence of light, and returning the water to the aquarium. The process is capable of reducing the concentration of contaminants in the water by one-half in a period of 2 days or less. The process may be carried out using the photocatalytic fluid purification system of the present invention.

In another application, the present invention may be part of a series of water purification steps. For example, discrete canisters or housings containing activated carbon, a woven filter, and mixed-bed ion-exchange resins are the basic components of many high purity process water systems. For the production of even higher purity water, the photocatalytic unit could be installed at the end of the series and would be one more component of the water purification system. In this example, it is providing a final polish to purified water by removing trace organic compounds. Pressure for fluid flow is derived from the municipal water line or an auxiliary pump.

DETAILED DESCRIPTION

Figure 1:
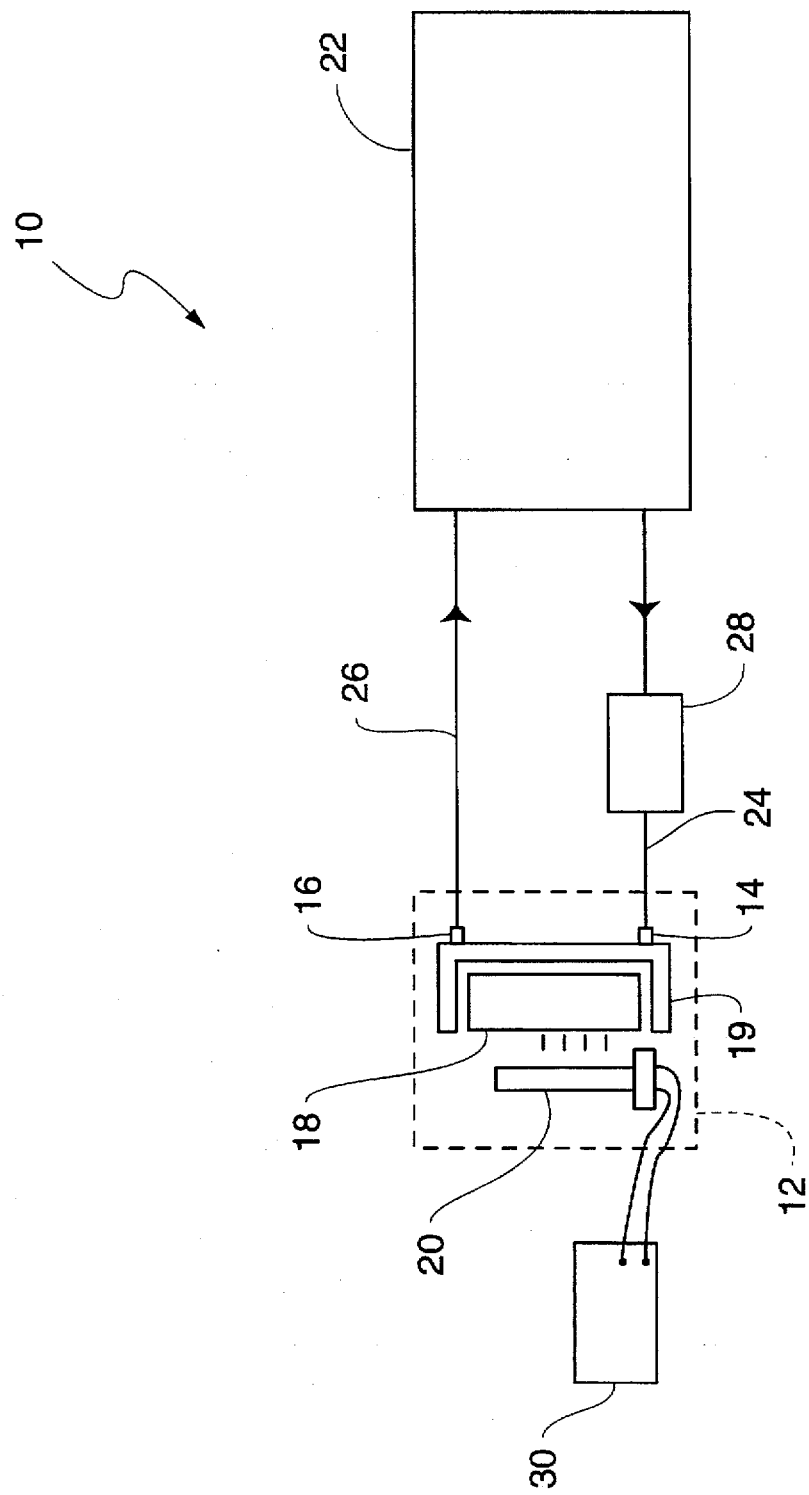
FIG. 1 is a block diagram illustrating one embodiment of the system of the present invention.

The present invention relates to a replaceable cartridge for use in a photocatalytic fluid purification system. The cartridge is of simple construction and is relatively inexpensive to manufacture. The cartridge can be removably inserted into a system, used for a period of time, and then replaced after its effectiveness has been reduced below an acceptable level. The disposable nature of the cartridge makes it a practical alternative for fluid purification applications where photocatalysis has not heretofore been utilized. The cartridge also has health advantages. One such advantage is related to the reduced need for handling the flexible, porous element once it is installed in the cartridge. Handling of the element creates stresses on the mesh that can dislodge and aerosolize the semiconductor particles thereon which may be harmful if inhaled. A reduction in the handling of the element, therefore, results in a reduction in the possibility of inhaling these particles.

The invention is useful in a variety of different fluid purification applications including, for example, purifying the water in an aquarium. Other possible applications include home air purification, decontamination of the air in hospitals for those with impaired immune systems, the destruction of organic contaminants in industrial air vents and work-spaces, purification of municipal drinking water, the destruction of microorganisms and trace organic toxicants in home drinking water, provision of drinking water in remote areas, and the production of process water for pharmaceutical production, beverage manufacturing, and microelectronics. Another possible application is in the production of ultra high purity water for molecular biology and biotechnology. A current commercial photocatalytic system provides such ultra high purity water, however the equipment is relatively costly and complex, and replacement of the photocatalyst is difficult and time consuming. The present invention provides a photocatalytic system which is relatively inexpensive and allows for rapid replacement of the photocatalyst. The invention is particularly useful in applications where frequent replacement of the photocatalyst is required.

The present invention permits significant (approximately 1000–2000%) improvement in performance to the existing UV water purification industry for a relatively insignificant (approximately 1%) additional cost. Applications of conventional UV units can range from purifying municipal drinking water to purifying aquariums. However, the process of irradiating with UV light alone to purify water and air is fundamentally inefficient in comparison to photocatalysis. The UV lamps utilized in this industry can drive photocatalytic reactions and the UV reactors have similar geometries to photocatalytic reactors. Prior to the present invention, however, there was enough discrepancy in the required geometry to make retrofitting these UV purifies with a photocatalytic element impractical. The photocatalytic cartridge of the present invention allows easy retrofitting of many UV systems with a photocatalytic element.

The photocatalytic cartridge of the present invention can be used to destroy a wide range of impurities. For example, photocatalysis is capable of treating organic compounds, such as pesticides, hydrocarbons, DNA, proteins, endotoxins, alcohols, ketches, and aldehydes. Photocatalysis is also capable of destroying microorganisms, such as bacteria, yeast, algae, viruses, and possibly spores, cysts, and protozoa. To treat fluids contaminated by organic compounds and microorganisms, the cartridge photocatalytically oxidizes and degrades the impurities until all that remains are relatively harmless degradation products. In addition, photocatalysis is capable of removing certain metal ions, such as ions of lead, mercury, copper, and chromium. It is believed that the ions are photoreduced to the metal or an insoluble oxide which is deposited on the surface of the photocatalyst and is thus removed from the fluid stream.

A simple method of implementing photocatalysis for fluid purification is by immobilizing a photocatalyst on a substrate. Because it is important to achieve three dimensional distribution of the photocatalyst in the fluid during purification, porous substrates are preferred. Fiber meshes such as fiberglass or woven fiberglass are very desirable substrate materials because of their highly dispersed, three dimensional structure, their chemical inertness, and their low cost. However, because of their lack of rigidity, fiber meshes are messy, somewhat dangerous, and inconvenient to handle and replace. The present invention provides a safe, inexpensive, convenient, and standardized method of introducing and replacing a three-dimensional porous substrate having a semiconductor coating into a photocatalytic fluid purification system.

The replaceable cartridge of the present invention may be used in a photocatalytic fluid purification system 10 as illustrated in FIG. 1. It should be appreciated that the word fluid, as used herein, refers to both liquids and gases. The system includes: a photocatalytic unit 12 having an inlet 14, an outlet 16, a replaceable cartridge 18, a retention structure 19, and a light source 20; a fluid reservoir 22; a first channel 24 for delivering fluid from the reservoir 22 to the inlet 14; a second channel 26 for delivering fluid from the outlet 16 to the reservoir 22; a fluid pump 28; and a power source 30 for providing power to the light source 20. Photocatalytic purification of fluids is accomplished by creating fluid flow through the cartridge 18 using the fluid pump 28, while at the same time illuminating the element in the cartridge 18 using light source 20 and power source 30. For solar applications there is no need for light source 20 or power source 30.

Figure 2:
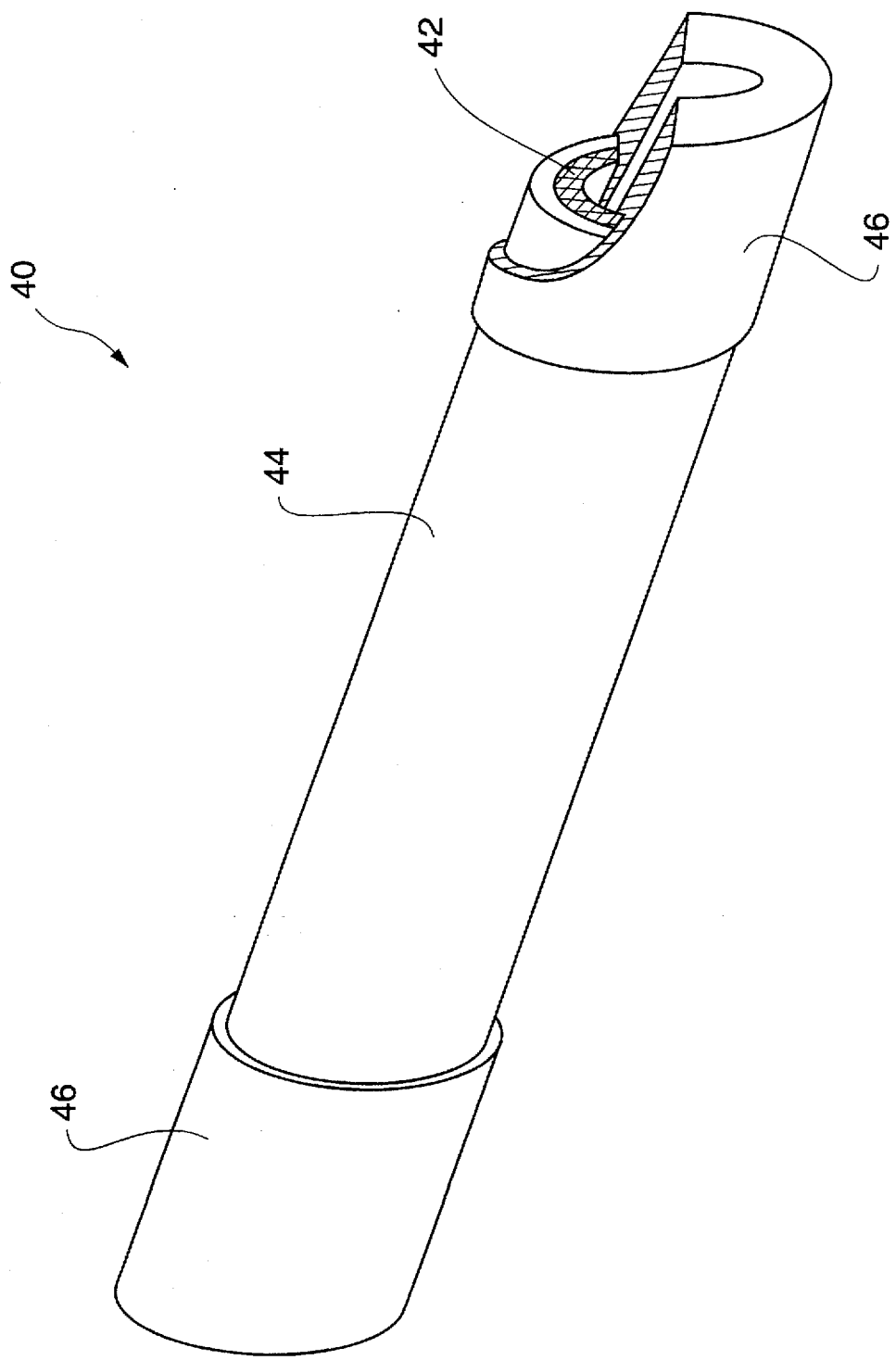
FIG. 2 is a partially cut-away perspective view of one embodiment of the cartridge of the present invention.

FIG. 2 is a partially cut-away, perspective view of one embodiment of the replaceable photocatalytic cartridge of the present invention. For convenience, this embodiment will be referred to by the reference numeral 40. As illustrated in FIG. 2, cartridge 40 includes: a flexible, porous element 42, a rigid support structure 44, and two end-caps 46. The flexible, porous element 42 is comprised of a fibrous mesh sheet impregnated with a semiconductor coating, which is wound into a cylindrical shape. The rigid support structure 44 surrounds and supports the element 42. It should be understood that the word "rigid", as used herein, can mean "stiff, yet flexible" and is not limited in connotation to the meaning "completely inflexible". The end-caps 46 cover the ends of the support structure 44 and the element 42 for securing the element 42 to the support structure 44 and for making the cartridge 40 more structurally sound. Because of the flexibility of the element 42, it is unable to be handled in such a manner that it is easily replaceable as a disposable element in a water purification system. Thus, by providing a rigid support, the flexible photocatalytic element can now be readily used as a replaceable component. In this manner, photocatalytic systems can be feasible in a variety of applications which before were unsuitable because of the cost, potential health danger, and technical expertise required for replacing photocatalytic elements.

The flexible, porous element 42 is made of any suitable material to which a semiconductor coating will adhere and which allows a fluid to pass through having sufficient surface area contact with the semiconductor coating to obtain acceptable rates of purification. This material can be, for example, fiberglass or glass wool. The material may be woven, like a cloth, non-woven, like fiberglass insulation, or in other suitable configurations. The mesh is impregnated with a semiconductor coating using any material having photocatalytic properties. The coating may be comprised of, for example, oxides and mixed oxides of transition metals or Group IA and Group IIA metals. These materials may be doped with trace impurities or surface coated with ordinary catalytic metals, such as platinum, copper, and ruthenium to enhance activity. The material used may be one or more of the following: $TiO_2$, $ZnO$, $SnO_2$, $SrTiO_3$, $WO_3$, and $Fe_2O_3$. Preferred materials include strontium niobate, potassium tantalate, tantalum oxide, and, most preferred, titanium dioxide. As used herein, the words semiconductor and photocatalyst are interchangeable.

The semiconductor coating may be associated with the flexible, porous element using any one of a number of processes. In a preferred process, a slurry is first created by combining a semiconductor powder and a liquid, such as water. The flexible, porous element is then contacted with the slurry, for example, by dipping the flexible, porous element into a vessel containing the slurry and then removing it. The coated flexible, porous element is then allowed to dry, leaving the semiconductor powder associated with the element. Another process for associating the semiconductor coating with the flexible, porous element is disclosed in U.S. Pat. No. 4,892,712 to Robertson et al. It should be appreciated that the present invention may utilize any technique to associate the semiconductor coating with the flexible, porous element and is not limited to any one process. The specific nature of the association is not known to be critical. For example, the association can be in the nature of a covalent bond, some charge or ionic interaction, an agglomeration, or general entrapment. The flexible, porous element 12 may be formed into its final shape either before or after the semiconductor coating is associated with it.

As mentioned above, the flexible, porous element 42 may be woven or non-woven. If a woven cloth material is used, several layers of mesh are generally required to achieve an acceptable photocatalytic cross-section, i.e., cross-sectional volume of the element in which photocatalytic activity takes place. If several layers of mesh are used, the mesh material contains a high percentage of void, i.e., holes through which light can pass, so that light reaches a sufficient number of layers to achieve the desired photocatalytic cross-section. If a non-woven material is used for the element, a single layer of mesh may be used while still obtaining adequate photocatalytic cross-section. A non-woven mesh material is chosen which has a fiber density that allows light to penetrate into the mesh to a depth adequate to create the desired cross-section.

The function of a rigid support structure in the present invention is to maintain the flexible, porous element having the semiconductor coating in a configuration adequate to achieve sufficient contact between the fluid to be purified and the semiconductor coating. A second function is to allow for the simple and efficient replacement of photocatalytic cartridges in systems. Thus, such cartridges can be replaced by individuals without special technical training or equipment being necessary. A variety of specific rigid supports are described throughout.

With reference to FIG. 2, it is seen that in this embodiment the rigid support structure 44 surrounds the flexible, porous element 42 for giving structural support to the element 42. The support structure 44 is made of a material which is relatively stiff compared to the mesh material so that easy handling in removal and replacement of the cartridge can be achieved. For example, the rigid support structure 44 may be constructed of polypropylene sheet material or other polymeric sheet material. The rigid support structure 44 is wound into a cylindrical shape having an inner surface adjacent to and abutting the outer surface of the flexible, porous element 42. The support structure 44 is then secured in a cylindrical shape by using fasteners, adhesives, or by welding. If a non-woven mesh material is used for the element 42, the mesh and the support structure 44 may be wound together in a single step. The unwound mesh is laid on top of the unwound support structure 44 and the two are then rolled into a cylindrical shape at the same time. The support structure 44 is then secured in this cylindrical shape as described above.

Depending upon the fluid flow configuration which will be utilized, the rigid support structure 44 may be porous or nonporous, i.e., perforated or non-perforated. For example, if radial fluid flow is to be used, the rigid support structure 44 must be porous to allow fluid to flow radially outward from the interior of the flexible, porous element 42 through the element 42 and the support structure 44. If axial fluid flow is to be used, however, the rigid support structure 44 should be non-porous so that the fluid is contained within the element as it travels axially from one end of the cartridge to the other. For convenience, the balance of the description of this embodiment of the present invention will be with respect to a cartridge adapted for radial fluid flow.

Figure 6A:
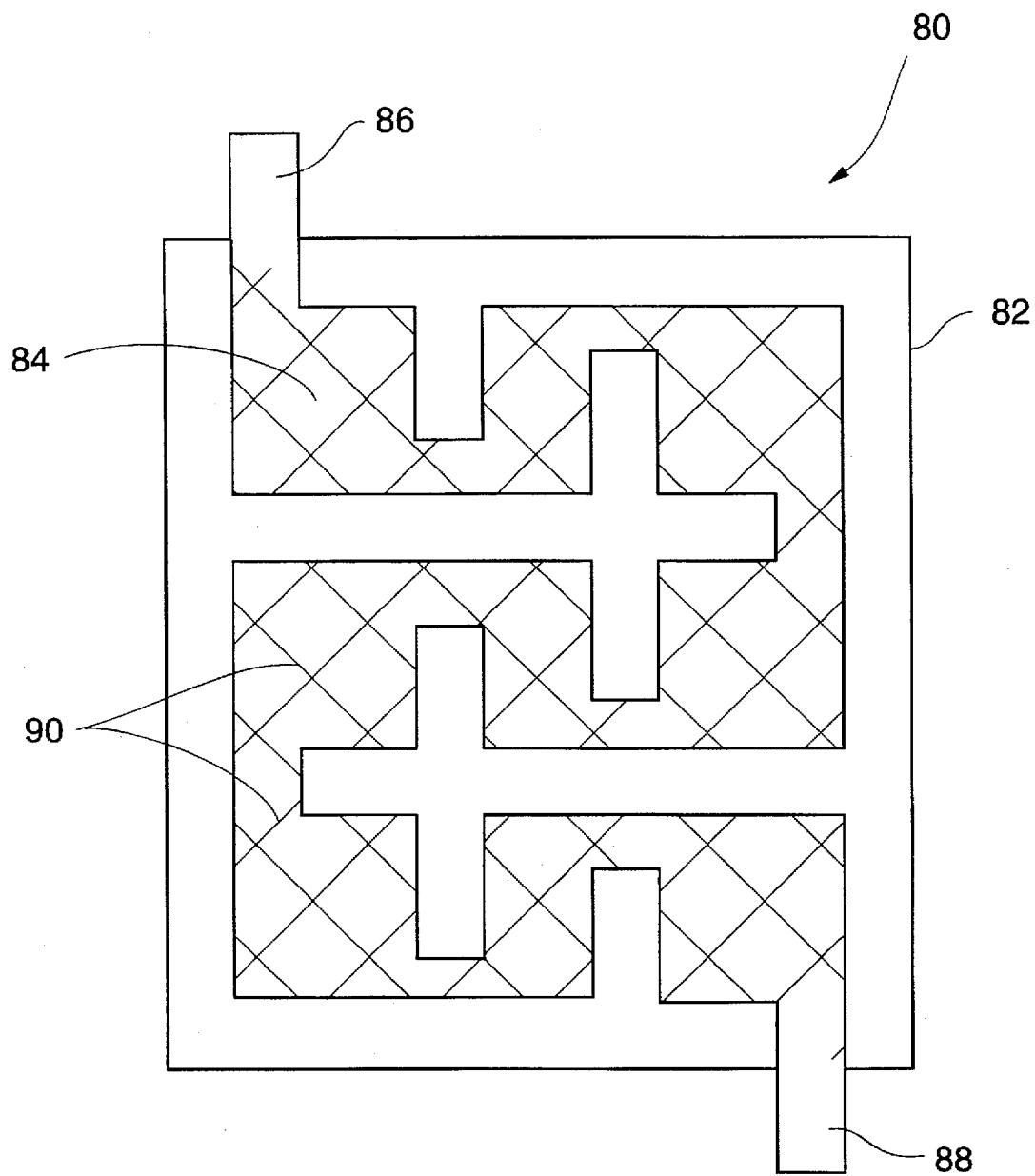
FIG. 6A is a top view of another embodiment of the cartridge of the present invention.
Figure 6B:
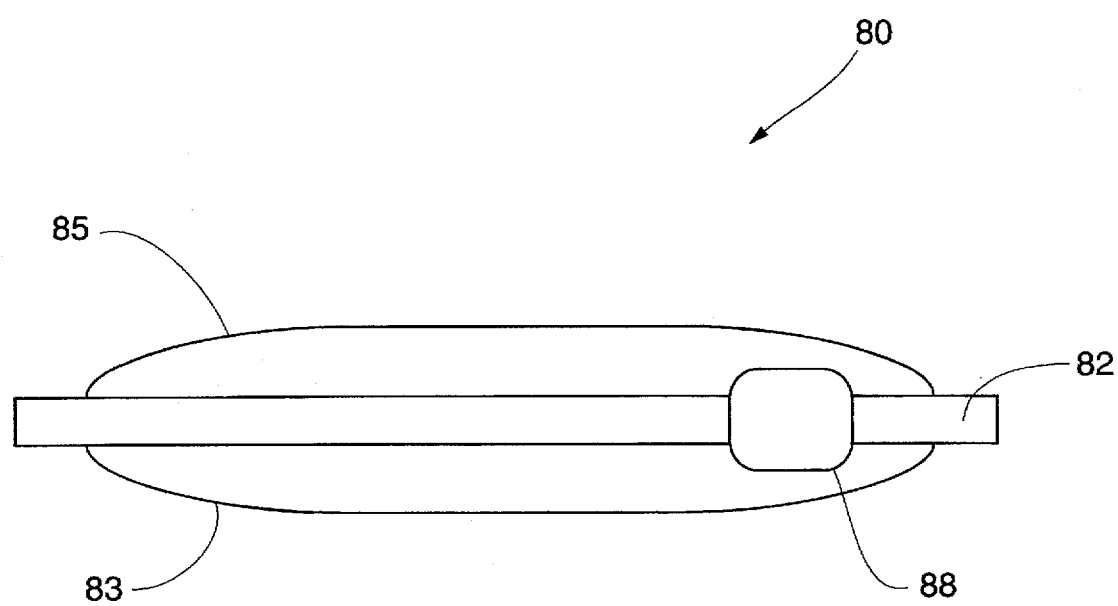
FIG. 6B is a front view of the cartridge of FIG. 6A.

The flexible porous element of the present invention and the rigid support are interrelated such that the rigid support provides support to the flexible porous element for the reasons identified above. The interrelationship can be achieved in a variety of ways depending on the particular structure of the elements and supports. A particular end cap for use in a cylindrical configuration is described below with reference to FIG. 3. In addition, an element and support can be associated such as by encasement as is shown in FIGS. 6A and 6B which are discussed in detail below.

Figure 3:
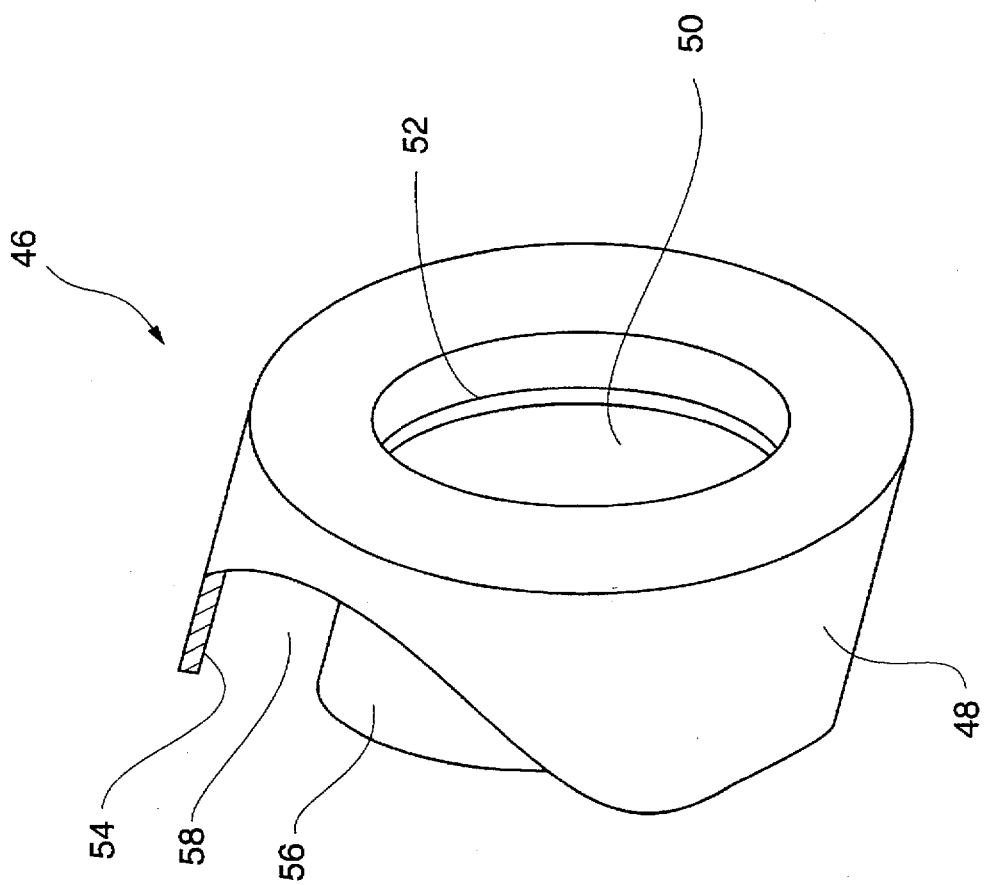
FIG. 3 is a partially cut-away perspective view of an end-cap used in the cartridge of FIG. 2.

FIG. 3 is a partially cut-away perspective view of one of the end-caps 46 used in the embodiment of the present invention illustrated in FIG. 2. As seen in FIG. 3, the end-cap 46 includes a ring-shaped body 48 having a circular aperture 50 through its center. The end-cap 46 can also include a rubber O-ring 52 disposed within the circular aperture 50 which acts as a fluid seal, as will be discussed in more detail later in the specification. In addition, the end-cap includes a first interior surface 54 and a second interior surface 56 which form the boundaries of an internal hollow 58 within the end-cap. The end-cap 46 is placed over the end of the element/support assembly 42/44 so that the edge of the element 42 and the edge of the rigid support 44 enter the internal hollow 58 of the end-cap 46. When the end-cap is properly installed, interior surface 54 will be engaging a portion of support structure 44 and interior surface 56 will be engaging a portion of the flexible, porous element 42 for securing the support structure 44 to the element 42. The aperture 50 in end-cap 46 is large enough to allow a tubular light source to be placed through it and into an internal tubular pocket of the cylindrical element.

The replaceable cartridge of the present invention is adapted to be capable of being removably inserted into a photocatalytic system in a position adjacent to a light source and in a fluid flow path. A variety of structural configurations are suitable to meet those requirements. As basic requirements for a photocatalytic system, the substrate having photocatalytic material must be in contact with fluid being purified in the presence of light. With particular regard to the present cartridge and system, the components are adapted and structured so that the fluid flow path can be readily, such as without tools or equipment, disrupted. A spent cartridge is then removed, and a fresh cartridge inserted into the fluid flow path which is then re-connected.

Figure 4:
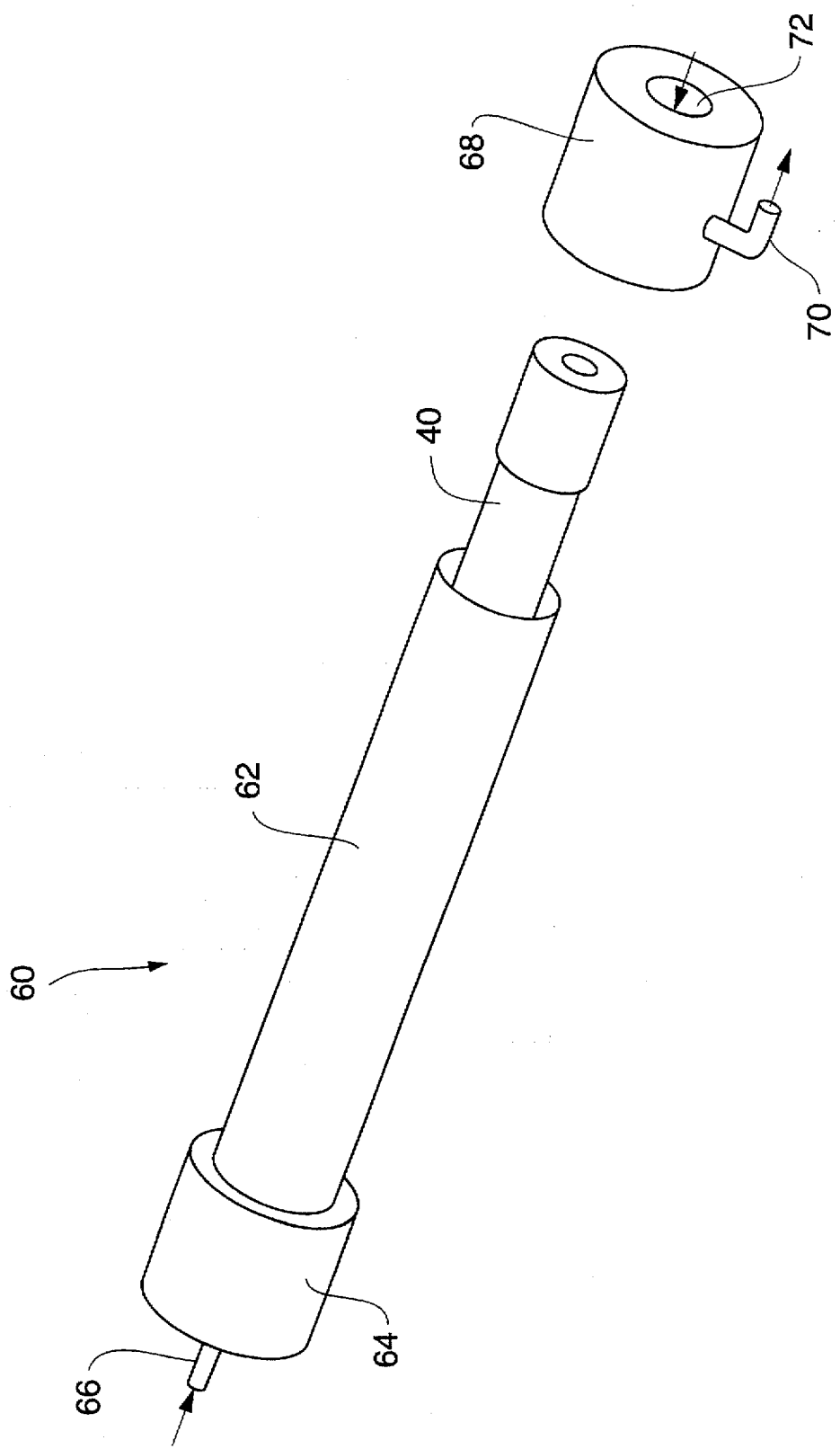
FIG. 4 is a perspective view of a partially assembled housing containing the cartridge of FIG. 2.
Figure 5:
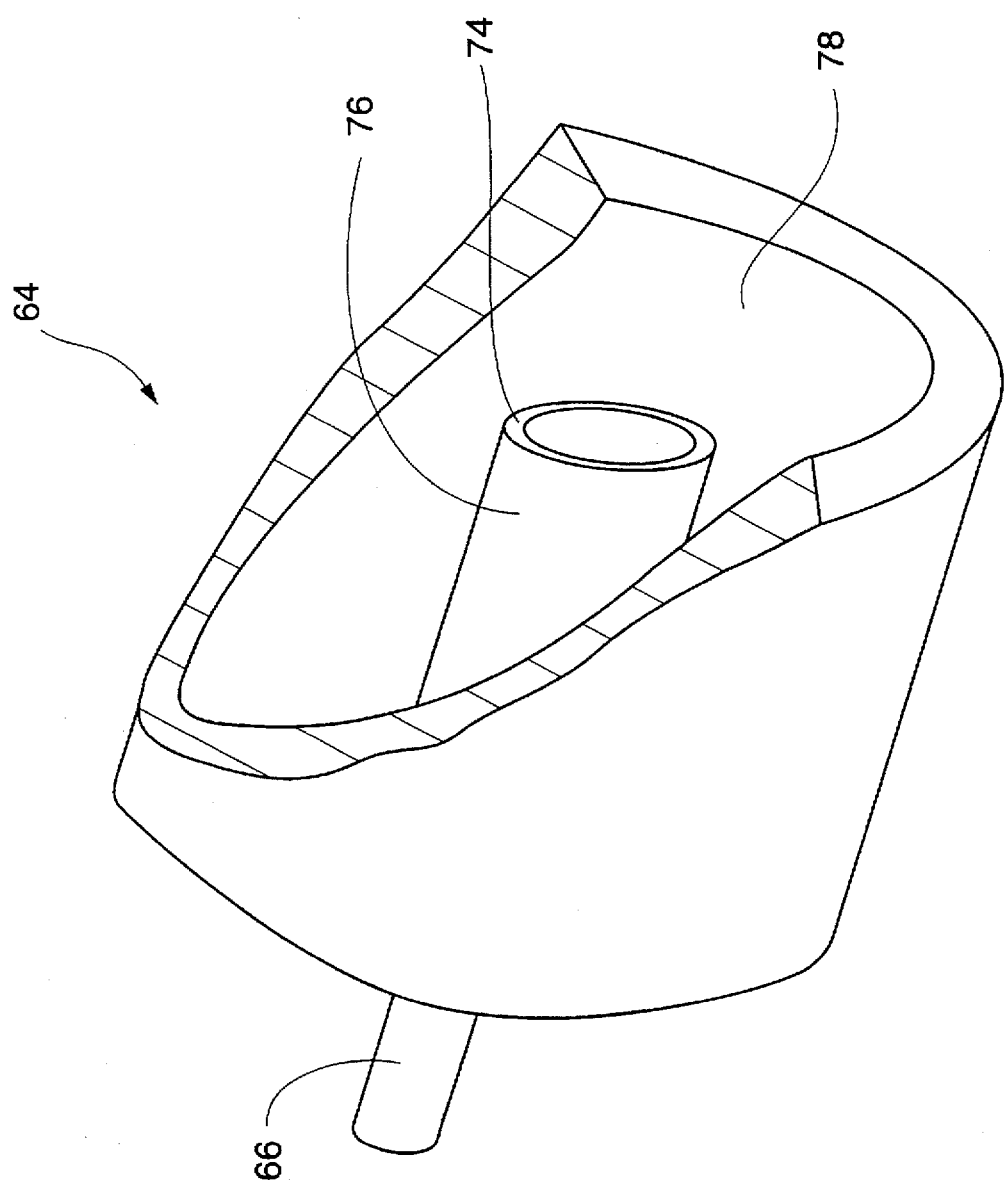
FIG. 5 is a partially cut-away perspective view of an end unit used in the housing of FIG. 4.

As illustrated in FIG. 4, element 40 is placed within a housing 60 to effect fluid purification. Housing 60 includes a cylindrical body 62, a first end unit 64 having an inlet 66, and a second end unit 68 having an outlet 70 and an aperture 72. The cylindrical body 62 is made of a rigid, preferably lightweight material and has an interior diameter greater than the largest exterior diameter of the cartridge. As illustrated in FIG. 5, first end unit 64 includes a rigid tube structure 74 protruding from an interior wall and having an exterior surface 76. Rigid tube structure 74 is operative for receiving fluid from inlet 66 and delivering it to cartridge 40. First end unit 64 also includes an interior surface 78.

First end unit 64 is mounted onto one end of the cylindrical body 62, whereby interior surface 78 engages an exterior surface of the body to create a fluid seal between the first end unit 64 and the body 62. Cartridge 40 is installed in the housing 60 by sliding it into the opposite end of the body until it engages the end of rigid tube structure 74. Slight pressure is then applied to the cartridge so that rigid tube structure 74 enters the aperture 50 in the corresponding end-cap 46 of the cartridge 40. Once the rigid tube structure 74 is firmly within the aperture 50 of the end-cap 46, a fluid seal is created by the exterior surface 76 of the rigid tube structure 74 engaging the O-ring 52 mounted within the aperture 50.

After the cartridge is properly in place within the body 62 of the housing 60, second end unit 68 is installed on the opposite end of the body 62 from first end unit 64. As with the first end unit 64, a fluid seal is created between the second end unit 68 and the body 62 of the housing 60. After the second end unit 68 has been installed, a tubular light source (not shown in the drawing) is inserted through the aperture 72 of the second end unit 68 and through the aperture 50 of the corresponding end-cap 46 of the cartridge 40 into an internal tubular pocket of the flexible, porous element 42. An exterior surface of the tubular light source engages the O-ring 52 within the aperture 50 of the corresponding end-cap 46 for creating a fluid seal between the tubular light source and the corresponding end-cap 46.

In practice, the housing 60 will be permanently installed in a photocatalytic fluid purification system, such as the one illustrated in FIG. 1. The cartridge 40 will be periodically removed and replaced whenever its effectiveness has declined below an acceptable level. The inlet 66 of the housing 60 will be connected to the first channel 24 for receiving impure fluid from the fluid reservoir 22. The outlet 70 of the housing 60 will be connected to the second channel 26 for delivering purified fluid to the fluid reservoir 22. The second channel 26 is preferably comprised of a flexible tubing which is readily removed from the outlet 70 of the end-cap 68 without need for special tools or skills. The pump 28 is operative for providing pressurized fluid flow to the cartridge 40.

In operation, the housing 60 receives impure fluid through inlet 66. This fluid flows through rigid tube structure 74 into an interior region of the cartridge between the flexible, porous element 42 and the tubular light source. Because a fluid seal exists between the rigid tube structure 74 and the corresponding end-cap 46 at one end of the cartridge and between the tubular light source and the corresponding end-cap 46 at the other end of the cartridge, a large percentage of the fluid will be forced through the cylindrical element 42 in a radial direction. In a preferred embodiment, the amount of the liquid being forced through the element 42 will exceed 50 percent. In a more preferred embodiment, the amount of the fluid being forced through the element will exceed 75 percent. In a most preferred embodiment, the amount of the fluid being forced through the element will exceed 99 percent.

At the same time that the fluid is being forced through the element, the tubular light source will be delivering light to the element. This light activates the semiconductor coating on the flexible, porous element 42 to act as a catalyst in a reaction which modifies an impurity in the fluid. After the fluid passes through the element, it travels through an area between the support structure 44 and the body 62 of the housing 60 until it reaches outlet 70 of second end-unit 68. From there, the purified fluid returns to the reservoir through second channel 26.

FIGS. 6A and 6B illustrate another embodiment of the cartridge of the present invention. For convenience, this embodiment will be referred to by the reference numeral 80. As illustrated in the FIG. 6A, cartridge 80 includes a transparent, water-tight covering 82 surrounding a substantially flat, flexible, porous element 84. The covering includes an inlet 86 and an outlet 88 for allowing fluid to enter and exit the cartridge 80, respectively. As illustrated in FIG. 6B, the cartridge 80 may have the appearance of a pillow when viewed from the side. It should be understood that the cartridge of this embodiment can be manufactured in a number of different shapes, such as a cylindrical shape, and is not limited to the shape illustrated in FIG. 6B.

The element 84 in cartridge 80 may be comprised of the same mesh materials used for the element 42 of the previous embodiment. A non-woven mesh, however, is preferred because it is inherently compressible and is more likely to fill the entire void within the covering 82 than is a woven mesh. Also, the element 84 will be associated with a semiconductor coating, such as those mentioned in the description of the previous embodiment.

The covering 82 of the cartridge 80 is made of a material which is transparent to the particular wavelength of light which is required to activate the semiconductor material which is associated with the element 84. The material may include, for example, teflon or other UV transmitting flouroelastomers, or similar polymeric material. The material used for the covering 80 may also have structural rigidity adequate to perform the same two general functions as the rigid support structure 44 of the previous embodiment. Alternatively, a bottom portion 83 of the covering 80 may have the required structural rigidity while an upper portion 85 does not. In some very low pressure applications, the cartridge may be provided sufficient structural support by simply resting it on a rigid surface. In higher pressure applications, the cartridge may require a rigid housing with a transparent window. The covering 82 is water-tight, except for an inlet 86 and an outlet 88 through which a fluid can flow.

The cartridge may contain a plurality of compartments 90 through which the fluid must flow in order to get from the inlet 86 to the outlet 88. Each compartment 90 is filled with a portion of the element 84 and therefore contributes to the purification of the fluid by the cartridge 80. The use of compartments 90 in the cartridge 80 increases the distance that the fluid must flow through the element 84 in the presence of light and therefore increases the overall effectiveness of the cartridge 80. The compartments 90 also help reduce the effect of fluid channelling and provide additional structural strength via a multiplicity of welds.

The cartridge 80 may be constructed in a relatively simple and inexpensive manner. In one method of construction, a thin sheet of plastic material is first laid on a flat surface. Next, a flat mesh having an area smaller than the plastic sheet is laid on top of the sheet. Then, another thin sheet of plastic having the same dimensions as the first sheet is laid on top of the mesh and the top sheet is welded to the bottom sheet all around the perimeter of the mesh, leaving a small opening for the inlet and the outlet. Alternatively, the three layer stack can be placed into a compression mold which can simultaneously create the entire seal around the perimeter of the mesh and the separate compartments 90 of FIG. 6A.

In practice, cartridge 80 is removably inserted into a photocatalytic fluid purification system 10, such as the one illustrated in FIG. 1. The cartridge 80 is placed in a support housing within the system 10 which holds the cartridge in place during operation of the system 10. After the cartridge 80 is in place, inlet 86 of cartridge 80 is connected to first channel 24, for receiving impure fluid from the fluid reservoir 22, and outlet 86 of cartridge 80 is connected to second channel 26, for delivering purified fluid to the fluid reservoir 22. The cartridge 80 can be periodically removed and replaced when its effectiveness has dropped below an acceptable value.

Figure 7A:
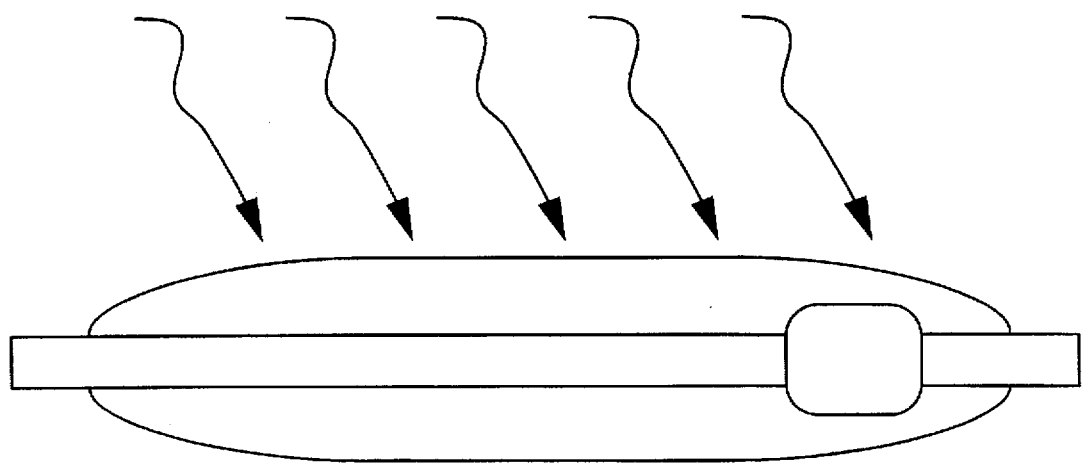
FIGS. 7A and 7B are front views of the cartridge of FIG. 6A illustrating two possible methods of illuminating the cartridge.
Figure 7B:
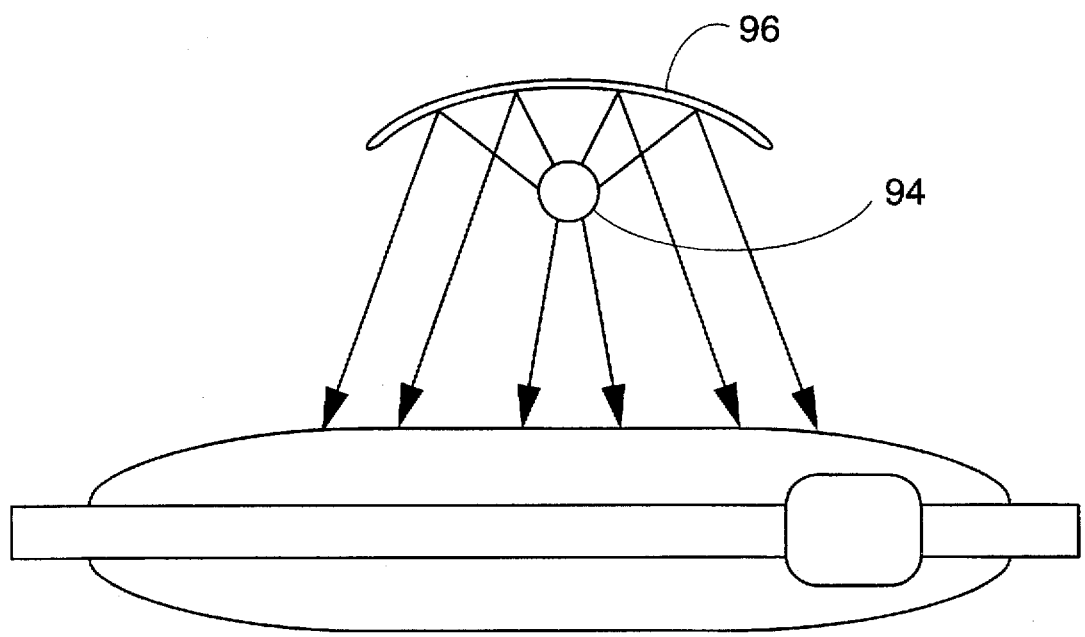

When inserted into system 10, the cartridge 80 is placed in close proximity to a light source 20. The operation of the system 10 using cartridge 80 is substantially the same as the operation of the system using the cartridge 40 of the previous embodiment. The impure fluid is forced through the element in the presence of light, during which time impurities in the fluid are modified by the catalytic action of the semiconductor coating. As illustrated in FIGS. 7A and 7B, any number of different methods of illuminating the cartridge 80 may be utilized. For example, FIG. 7A shows a cartridge 80 being illuminated by solar radiation. FIG. 7B shows a cartridge 80 being illuminated by both direct and reflected light from a light source 94 and an associated reflector 96.

The following examples and test results are provided for the purpose of illustration and are not intended to limit the scope of the invention.

EXAMPLES

Example 1

An experiment was performed to compare the performance of water purification systems using photocatalytic elements to that of a system which uses only ultra-violet light to perform purification, such as are commonly used in aquariums. Systems using both axial fluid flow and radial fluid flow through the photocatalytic elements were tested. The experiment involved separately connecting each system to a reservoir containing a solution of water and a red dye consisting of an organic compound to determine the rate of decomposition of the red dye achieved by each system. To normalize the results of the comparison, each test used the same ultra-violet light source and each test provided an equivalent rate of fluid flow through the corresponding system.

The experiment tested three systems. The first system included a photocatalytic element adapted for axial fluid flow. The element was fit snugly into the annular volume between an internal tubular light source and an external cylindrical jacket. The second system included a photocatalytic cartridge adapted for radial fluid flow. The cartridge was placed into a housing and the light source was placed in an internal tubular pocket in the cartridge. The third system used the same housing as the second system, and the same light source, but with the photocatalytic cartridge removed.

To perform each test, a purification system was first connected to the reservoir containing the red dye solution. A pump was then turned on forcing solution from the reservoir, through the subject system, and back to the reservoir. Periodically during each test, samples of solution were taken from the reservoir and measured for dye concentration. To determine the concentration of the dye in each sample, a spectrophotometer was used to measure the light absorption of the sample at a wavelength of 492 nm, the wavelength of maximum light absorption for the dye. The concentration of dye in each sample, as a percentage of the initial concentration of dye at the time the test was begun, was then plotted versus time to graphically display the rate of decomposition of the red dye in the solution produced by each system.

Figure 8:
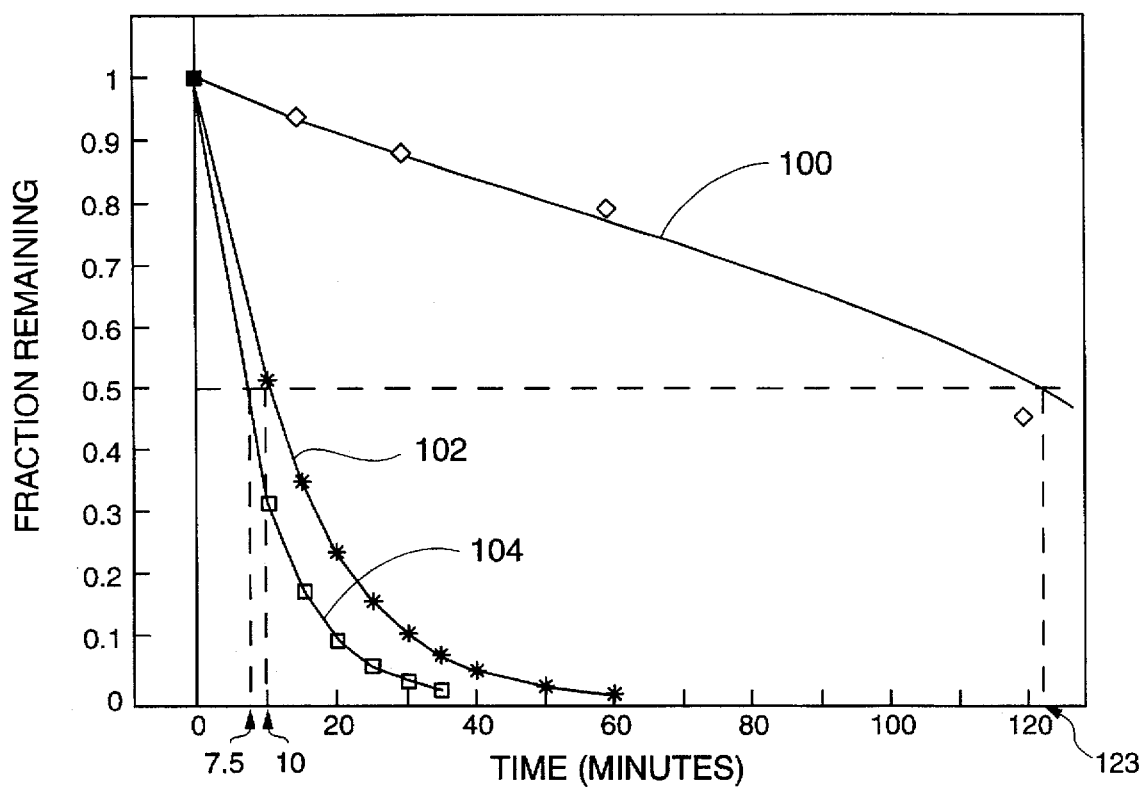
FIG. 8 is a graph showing the results of an experiment comparing the effectiveness of three different purification systems.

FIG. 8 is a graph illustrating the rate of decomposition of the red dye produced by each system tested. Curve 100 illustrates the rate of decomposition for the system using only ultra-violet radiation. Curve 102 represents the rate of decomposition for the system using the radial flow cartridge. Curve 104 represents the rate of decomposition for the system utilizing axial fluid flow. As seen in FIG. 8, the half-lives of the dye in the solution are 123, 10, and 7.5 minutes, respectively. This result indicates that systems using photocatalytic fluid purification are at least 12–17 times more effective than systems using ultra-violet treatment alone. In addition, additives may be added to the photocatalytic elements in the photocatalytic systems which have the potential to double the efficiency of these systems. Thus, the present invention which provides for the rapid, efficient use of photocatalytic systems in a variety of applications, such as aquariums, allows for significant improvements in effectiveness compared to technology currently in use.

Example 2

Figure 9:
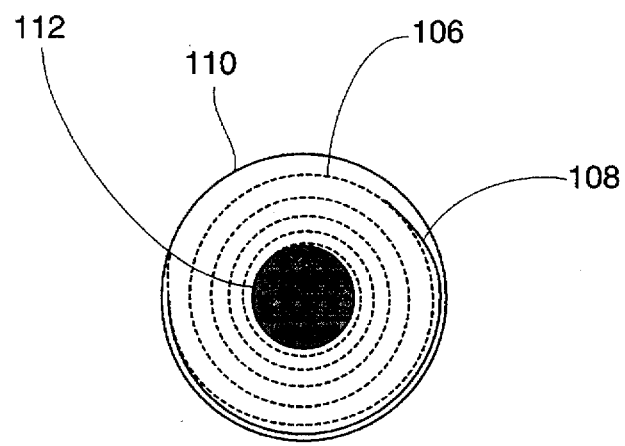
FIG. 9 is a cross-sectional view of a photocatalytic unit, including a housing, a light source, and a cartridge, used in experiments to determine the effectiveness of a photocatalytic cartridge in removing impurities from a gas.

An experiment was performed to determine the effectiveness of a photocatalytic cartridge in removing impurities from a gas. With reference to FIG. 9, the cartridge used in the experiment was made in the following manner. First, a photocatalyst coating was applied to a woven fiberglass cloth 106 having a leno weave with a high degree of void and to one side of a piece of cardboard. Next, an edge of the cloth 106 was attached to an edge of the piece of cardboard 108. The assembly was then rolled around a mandrel with the cloth 106 on the inside and the cardboard 108 on the outside. The photocatalyst coated surface of the cardboard 108 faced the inside. The resulting cartridge had a diameter less than the inner diameter of a cylindrical reactor housing 110 for easy insertion of the cartridge into the housing 110. The reactor housing 110 was a stainless-steel tube containing a low pressure mercury lamp 112 at its center. Upon insertion of the cartridge into the housing 110, the restoring force of the rolled cardboard 108 caused the cartridge to expand snugly against an inner wall of the reactor housing 110. Simultaneously, the woven fiberglass cloth 106 unrolled slightly. The layers of the fiberglass cloth 106 distributed themselves throughout the annular volume defined by the outer surface of the lamp 110 and the inner surface of the housing 108. The large number of wraps ensured complete light absorption, and the looseness of the wraps ensured a low pressure drop and good three-dimensional photocatalytic cross-section. The complex structure provided good convective mixing without the use of turbulent flow velocities.

Figure 10:
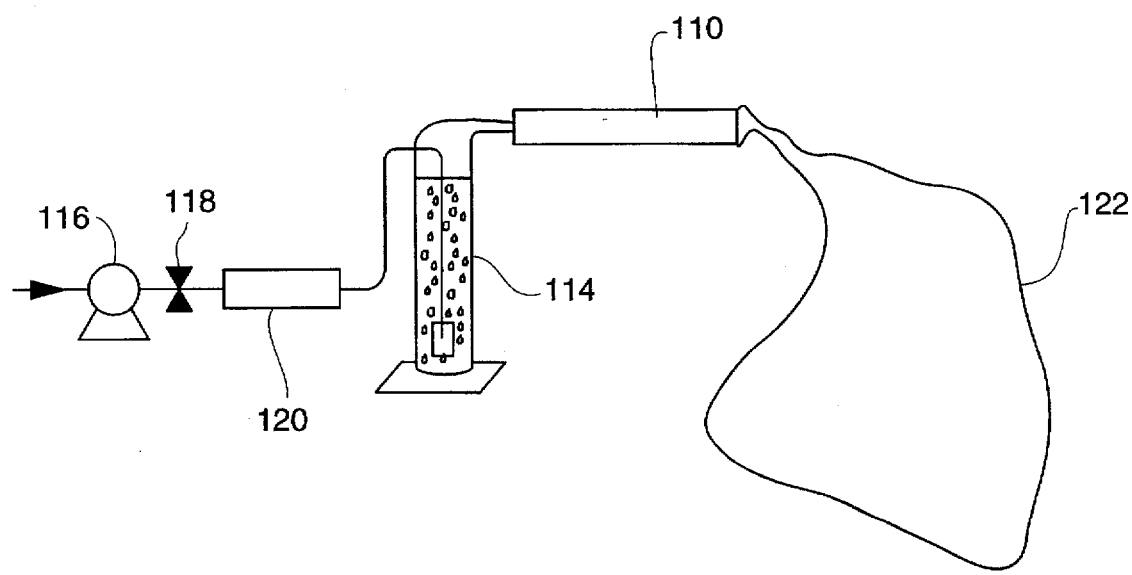
FIG. 10 is a schematic diagram of a test set-up used in an experiment utilizing the cartridge of FIG. 9.

As illustrated in FIG. 10, cologne and orange cleaner, both highly odoriferous, were individually dissolved in water contained in an air bubbler 114. Using a pump 116, a valve 118, and an activated charcoal filter 120, clean air was pumped through the bubbler 114, passed through the cartridge in the photocatalytic reactor housing 110, and then collected in a large plastic bag 122. With the lamp 112 off, the odors of the agents were readily detected in the bag 122. When the experiments were repeated with the lamp 112 on, neither the odor of cologne nor orange was detected.

Example 3

Figure 11:
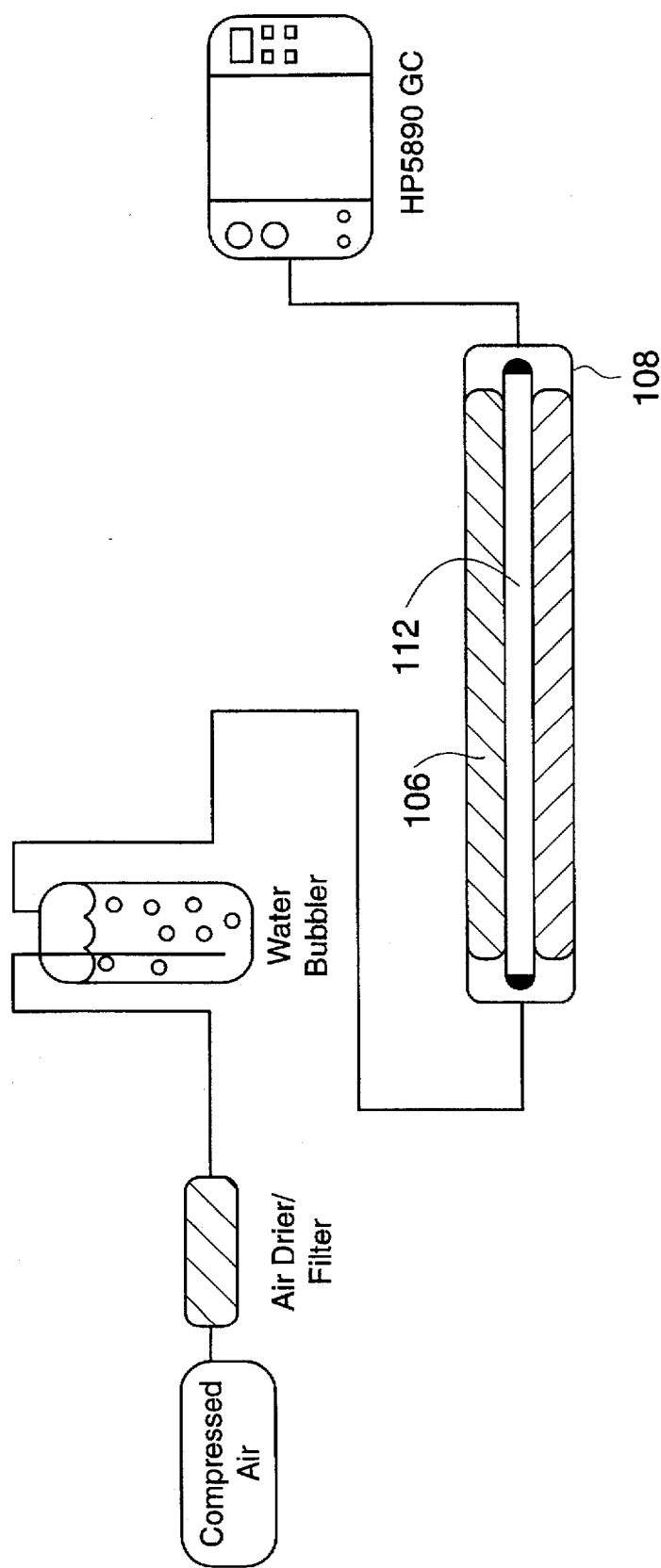
FIG. 11 is a schematic diagram of a test set-up used in another experiment utilizing the cartridge of FIG. 9.
Figure 12:
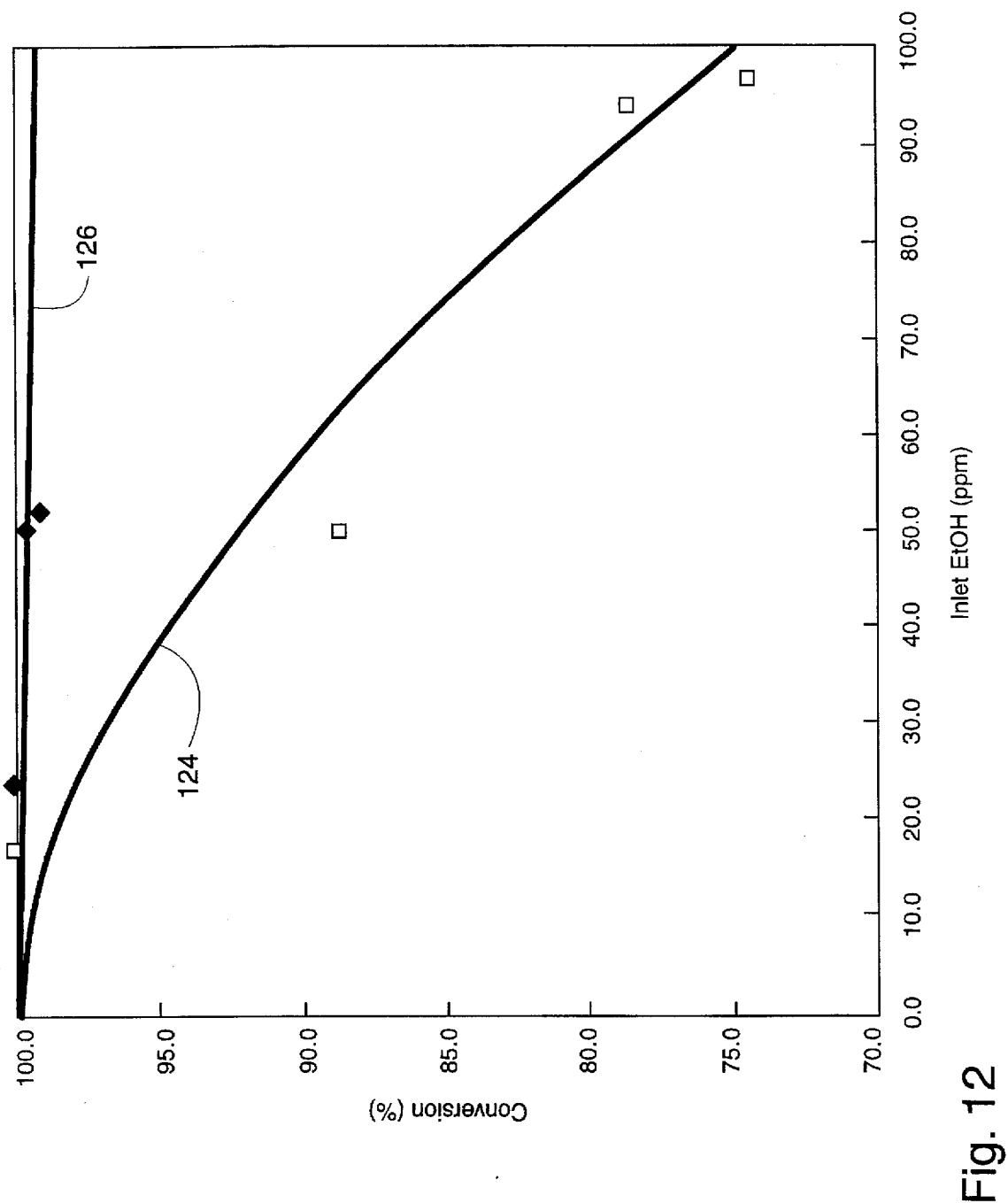
FIG. 12 is a graph showing the results of the experiment which uses the test set-up of FIG. 11.

Another experiment was performed to determine the effectiveness of a photocatalytic cartridge in removing impurities from a gas. The experiment used gas chromatography to measure a cartridge's ability to decompose ethanol. The experimental set-up is shown in FIG. 11. For comparison, a reactor using a cartridge as described in the previous example and a reactor using a photocatalyst merely as a surface coating on glass tubes (two-dimensional reactor) were tested. The results of the experiment are shown in FIG. 12 which illustrates the percentage of ethanol decomposed by each of the two reactors as a function of the ethanol concentration. Curve 124, for the two-dimensional reactor, shows the efficiency of ethanol decomposition diminishing rapidly with increasing ethanol concentration. However, curve 126, for the cartridge reactor, shows the efficiency of ethanol decomposition remaining at approximately 99% at the highest concentration measured.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A replaceable cartridge for use in a photocatalytic fluid purification system, said system having a light source and a fluid flow path, said cartridge comprising:

an element having a semiconductor coating attached thereto, said element being permeable to a fluid presented at a boundary of said element so that said fluid can flow through at least a portion of said element, said element having a first rigidity characterized by said element being substantially flexible so that said element is prone to bring deformed when being inserted into a confined area of said system having internal dimensions that are similar to the external dimensions of said element, wherein said element is capable of purifying, by photocatalysis, a fluid passed through said element in the presence of light;

a support means supporting said element, said support means having a second rigidity that is more rigid than said first rigidity so that said support means is unlikely to be deformed when being inserted into said confined area; and fluid seal means for creating an external fluid seal between a first boundary portion of said element and a second boundary portion of said element to facilitate the flow of fluid through said element from said first boundary portion to said second boundary portion wherein said fluid seal means is adapted for engagement with a portion of said system different from said cartridge to create said external fluid seal;

wherein said replaceable cartridge is adapted to be removably inserted into said confined area of said system, in a position adjacent to said light source and in said fluid flow path, without said element being deformed.

2. A replaceable cartridge, as claimed in claim 1, wherein; said fluid seal means comprises a gasket.

3. A replaceable cartridge, as claimed in claim 1, wherein: said element is comprised of a mesh wound into a cylindrical shape having an internal tubular pocket for reception of a tubular light source placed inside said cylindrically shaped element.

4. A replaceable cartridge, as claimed in claim 3, wherein:
said support means is cylindrical in shape and envelopes said element for giving support to said element so that said element may retain its cylindrical shape.

5. A replaceable cartridge, as claimed in claim 4, further comprising:
means for securing said cylindrically shaped element to said cylindrically shaped support means.

6. A replaceable cartridge for use in a photocatalytic fluid purification system, said system having a light source and a fluid flow path, said cartridge comprising:
an element having a semiconductor coating attached thereto, said element being permeable to a fluid presented at a boundary of said element so that said fluid can flow through at least a portion of said element, said element having a first rigidity characterized by said element being substantially flexible so that said element is prone to be deformed when being inserted into a confined area having internal dimensions that are similar to the external dimensions of said element, wherein said element is capable of purifying, by photocatalysis, a fluid passed through said element in the presence of light; and
a support means supporting said element, said support means having a second rigidity that is more rigid than said first rigidity so that said support means is unlikely to be deformed when being inserted into said confined area;
wherein said replaceable cartridge is adapted to be capable of being removably inserted into said system in a position adjacent to said light source and in said fluid flow path;
wherein said element is comprised of a mesh wound into a cylindrical shape having an internal tubular pocket for reception of a tubular light source placed inside said cylindrically shaped element;
wherein said support means is cylindrical in shape and envelopes said element for giving support to said element so that said element may retain its cylindrical shape;
means for securing said cylindrically shaped element to said cylindrically shaped support means;
wherein said means for securing includes ring-shaped end caps which fit over each end of said cylindrically shaped support means and engage a portion of said cylindrically shaped element for holding said portion in fixed relation to said support means, said ring-shaped end caps having a third rigidity that is more rigid than said first rigidity and at least one of said end caps having an interior diameter capable of allowing a tubular light source to be placed through said end cap and into said internal tubular pocket of said cylindrically shaped element for providing light to said element during operation.

7. A replaceable cartridge, as claimed in claim 6, wherein:
said ring shaped end caps include fluid seal means for conducting said fluid through said cylindrically shaped element, said fluid seal means being capable of creating a fluid seal between a first area, internal to said cylindrically shaped element, and a second area, external to said element.

8. A replaceable cartridge, as claimed in claim 7, wherein:
said fluid seal means includes an O-ring.

9. A replaceable cartridge for use in a photocatalytic fluid purification system, said system having a light source and a fluid flow path, said cartridge comprising:
an element having a semiconductor coating attached thereto, said element being permeable to a fluid presented at a boundary of said element so that said fluid can flow through at least a portion of said element, said element having a first rigidity characterized by said element being substantially flexible so that said element is prone to be deformed when being inserted into a confined area in said system having internal dimensions that are similar to the external dimensions of said element, wherein said element is capable of purifying, by photocatalysis, a fluid passed through said element in the presence of light; and
a support means supporting said element, said support means having a second rigidity that is more rigid than said first rigidity so that said support means is unlikely to be deformed when being inserted into said confined area;
wherein said replaceable cartridge is adapted to be capable of being removably inserted into said system in a position adjacent to said light source and in said fluid flow path;
wherein said element is comprised of a mesh wound into a cylindrical shape having an internal tubular pocket for reception of a tubular light source placed inside said cylindrically shaped element;
wherein said cylindrically shaped support means is porous for allowing a fluid to flow through said support means;
wherein said cylindrically shaped element includes a first area internal to said element and a second area external to said element; and
wherein said cartridge is adapted for radial fluid flow from one of said first area and said second area to the other of said first area and said second area, through both said cylindrically shaped element and said cylindrically shaped support means.

10. A replaceable cartridge, as claimed in claim 3, wherein:
said cartridge is adapted for axial fluid flow through said cylindrically shaped element from one end of said element to the other end of said element.

11. A replaceable cartridge, as claimed in claim 10, wherein:
said cylindrically shaped support means is non-porous and impervious to fluid flow.

12. A replaceable cartridge, as claimed in claim 10, wherein;
said internal tubular pocket of said cylindrically shaped element is adapted to fit closely around said tubular light source so that axial fluid flow in a region between said tubular light source and said element is substantially minimized.

13. A replaceable cartridge, as claimed in claim 10, further comprising:
a cylindrical, transparent support means, that is substantially impervious to fluid flow, fitting closely against an interior surface of said cylindrically shaped element for facilitating the confinement of fluid flow to said element and for allowing light from said tubular light source to reach said element.

14. A replaceable cartridge for use in a photocatalytic fluid purification system, said system having a light source and a fluid flow path, said cartridge comprising:

an element having a semiconductor coating attached thereto, said element being permeable to a fluid presented at a boundary of said element so that said fluid can flow through at least a portion of said element, said element having a first rigidity characterized by said element being substantially flexible so that said element is prone to be deformed when being inserted into a confined area having internal dimensions that are similar to the external dimensions of said element, wherein said element is capable of purifying, by photocatalysis, a fluid passed through said element in the presence of light; and a support means supporting said element, said support means having a second rigidity that is more rigid than said first rigidity so that said support means is unlikely to be deformed when being inserted into said confined area;

wherein said replaceable cartridge is adapted to be capable of being removably inserted into said system in a position adjacent to said light source and in said fluid flow path;

wherein said element is comprised of a three dimensional mesh structure having a first dimension in an x direction of a Cartesian coordinate system, a second dimension in a y direction of said Cartesian coordinate system, and a third dimension in a z direction of said Cartesian coordinate system, wherein said third dimension is substantially less than said first and second dimensions;

wherein said support means comprises a transparent plastic covering for said element, said covering including:
an internal area for holding said element;
inlet means for allowing fluid to enter said internal area of said covering;
outlet means for allowing fluid to exit said internal area of said covering; and
means for conducting fluid from said inlet means, through said element, to said outlet means;
wherein, except for said inlet means and said outlet means, said covering is substantially fluid-impenetrable.

15. A replaceable cartridge, as claimed in claim 14, wherein:
said means for conducting fluid includes a series of compartments internal to said covering for increasing the fluid flow length through said element.

16. A photocatalytic fluid purification system, comprising:
a photocatalytic unit, having:
a housing;
a cartridge different from and coupled to said housing and adapted for ready removal from said housing, comprising:
an element having a semiconductor coating attached thereto, said element being permeable to a fluid presented at a boundary of said element so that said fluid can flow through at least a portion of said element, said element having a first rigidity characterized by said element being substantially flexible so that said element is prone to be deformed when being inserted into a confined area having internal dimensions that are similar to the external dimensions of said element, wherein said element is capable of purifying, by photocatalysis, a fluid passed through said element in the presence of light;
a support means supporting said element, said support means having a second rigidity that is more rigid than said first rigidity so that said support means is unlikely to be deformed when being inserted into said confined area; and fluid seal means for creating an external fluid seal between a first boundary portion of said element and a second boundary portion of said element to facilitate the flow of fluid through said element from said first boundary portion to said second boundary portion, wherein said fluid seal means is adapted for engagement with a portion of said system different from said cartridge to create said external fluid seal;
means for illuminating said element;
inlet means on said housing for conducting fluid into said housing;
outlet means on said housing for conducting fluid out of said housing; and
means, internal to said housing, for conducting fluid from said inlet means, through said element, to said outlet means.

17. A photocatalytic fluid purification system, as claimed in claim 16, further comprising:
a fluid reservoir containing a fluid requiring purification;
means for conducting fluid from said fluid reservoir to said inlet means of said photocatalytic unit;
means for conducting fluid from said outlet means of said photocatalytic unit to said fluid reservoir; and
means for creating pressurized fluid flow through said photocatalytic unit from said inlet means to said outlet means.

18. A photocatalytic fluid purification system, as claimed in claim 17, wherein:
said fluid reservoir comprises an aquarium.

19. A photocatalytic fluid purification system comprising:
a photocatalytic unit, having:
a housing;
a cartridge coupled to said housing and adapted for ready removal, comprising:
an element having a semiconductor coating attached thereto, said element being permeable to a fluid presented at a boundary of said element so that said fluid can flow through at least a portion of said element, said element having a first rigidity characterized by said element being substantially flexible so that said element is likely to be deformed when being inserted into a confined area having internal dimensions that are similar to the external dimensions of said element, wherein said element is capable of purifying, by photocatalysis, a fluid passed through said element in the presence of light; and
a support means supporting said element, said support means having a second rigidity that is more rigid than said first rigidity so that said support means is unlikely to be deformed when being inserted into said confined area;
means for illuminating said element;
inlet means for conducting fluid to said cartridge;
outlet means for conducting fluid away from said cartridge; and
means for conducting fluid from said inlet means, through said element, to said outlet means;
wherein said means for illuminating said element includes a tubular light source;
wherein said element is comprised of a mesh wound into a cylindrical shape having an internal tubular pocket for reception of said tubular light source, wherein said cylindrically shaped element includes a first area internal to said element and a second area external to said element;

wherein said support means is cylindrical in shape and permeable to fluid flow, and envelopes said element for giving support to said element so that said element may retain its cylindrical shape;

wherein said means for conducting fluid includes:
a fluid seal between said first area and said second area so that a substantial portion of fluid entering one of said first area and said second area must flow through said flexible, porous element to get to the other of said first area and said second area;
means for delivering fluid from said inlet means to one of said first area and said second area; and
means for delivering fluid from the other of said first area and said second area to said outlet means.

20. A photocatalytic fluid purification system, as claimed in claim 16, wherein:
said means for illuminating said element includes a tubular light source;
said element is comprised of a mesh wound into a cylindrical shape having an internal tubular pocket for reception of said tubular light source;
said support means is cylindrical in shape and envelopes said element for giving support to said element so that said element may retain its cylindrical shape; and
said cartridge is adapted for axial fluid flow through said cylindrically shaped element from one end of said element to the other end of said element.

21. A photocatalytic fluid purification system, as claimed in claim 20, wherein;
said cylindrically shaped support means is non-porous and impervious to fluid flow;
said internal tubular pocket of said cylindrically shaped element is adapted to fit closely around said tubular light source, and
said means for conducting fluid includes;
means for delivering fluid from said inlet means to one end of said cylindrically shaped element; and
means for delivering fluid from the other end of said cylindrically shaped element to said outlet means.

22. A process for removing contaminants from water in an aquarium, using a photocatalytic fluid purification system, comprising:
delivering water from said aquarium to a photocatalytic unit;
contacting said water with a photocatalytic element within said photocatalytic unit in the presence of light; and
returning said water to said aquarium;
wherein said system is capable of operating such that said contaminants in said water have a half-life of 2 days or less.

23. A replaceable cartridge, as claimed in claim 1, wherein;
said support means is made of a polymeric material.

24. A cartridge for use in a photocatalytic fluid purification system, comprising;
a substrate member that is capable of being permeated by a fluid presented to a boundary of said substrate member, wherein said substrate member is coated with a semiconductor material that is capable of performing photocatalysis on a fluid in contact therewith in the presence of light having a predetermined spectral content, wherein said semiconductor material is suspended in three dimensions within said substrate member so that a fluid flowing through said substrate member comes in contact with said semiconductor material in three dimensions; and
a covering surrounding said substrate member, said covering forming a substantially fluid-impermeable barrier between said substrate member and an exterior environment except for an input means for allowing fluid to flow from said exterior environment to a first boundary of said substrate member and an output means for allowing fluid to flow from a second boundary of said substrate member to said exterior environment, said covering including means for directing pressurized fluid presented to said first boundary of said substrate member through said substrate member to said second boundary of said substrate member, wherein at least a portion of said covering is transparent to light having said predetermined spectral content;
wherein at least a portion of said covering that is adjacent said substrate member has a rigidity that does not provide structural support to said substrate member.

25. The cartridge, as claimed in claim 24, wherein said substrate member comprises a non-woven mesh material.

26. The cartridge, as claimed in claim 24, wherein
said means for directing fluid includes a plurality of compartments in said covering that effectively increases a fluid flow path length through said substrate from said first boundary to said second boundary.

* * * * *